United States Patent [19]
Yonemitsu et al.

[11] 3,954,904
[45] May 4, 1976

[54] STABILIZED POLYPHENYLENE ETHER RESIN COMPOSITION

[75] Inventors: Eiichi Yonemitsu, Kashiwa; Akitoshi Sugio, Omiya; Takanari Nawata; Masao Okabe, both of Tokyo; Masatsugu Matsunaga, Matsudo; Masaharu Kimura; Norio Sayama, both of Tokyo, all of Japan

[73] Assignee: Mitsubishi Gas Chemical Company, Inc., Tokyo, Japan

[22] Filed: Oct. 30, 1974

[21] Appl. No.: 519,195

[30] Foreign Application Priority Data

Nov. 2, 1973 Japan.............................. 48-123732

[52] U.S. Cl. ....................... 260/873; 260/45.9 NC; 260/47 ET; 260/874; 260/876 R; 260/887
[51] Int. Cl.² ......................................... C08L 67/06
[58] Field of Search ........ 260/45.9 NC, 874, 876 R, 260/873, 887, 47 ET

[56] References Cited

UNITED STATES PATENTS

| | | | |
|---|---|---|---|
| 3,383,435 | 5/1968 | Cizek................................... | 260/874 |
| 3,453,231 | 7/1969 | Bussink et al....................... | 260/874 |
| 3,462,515 | 8/1969 | Cantrill............................... | 260/873 |
| 3,485,778 | 12/1969 | Oertel et al. ................. | 260/45.9 NC |
| 3,639,508 | 2/1972 | Kambour.................... | 260/45.9 NC |

Primary Examiner—Theodore Morris
Assistant Examiner—J. Ziegler
Attorney, Agent, or Firm—Brooks Haidt Haffner & Delahunty

[57] ABSTRACT

Polyphenylene ether resins are stabilized with a substituted dicarboxylic acid dihydrazide.

7 Claims, No Drawings

STABILIZED POLYPHENYLENE ETHER RESIN COMPOSITION

BACKGROUND OF THE INVENTION

1. Field of the Invention

This invention relates to a stabilized polyphenylene ether resin composition, and particularly, to a polyphenylene ether resin composition thermally stabilized with a substituted dicarboxylic acid dihydrazide.

2. Description of the Prior Art

Polyphenylene ether resins have excellent mechanical properties and electrical properties and high heat distortion temperatures, but are susceptible to oxidation. In other words, polyphenylene ether resin is easily subjected to degradation by heat and ultraviolet rays, particularly the thermal stability is very low in the presence of oxygen and when exposed to high temperatures in air, the resin is easily colorized and becomes fragile. The low thermal stability of polyphenylene ether resins results in scorch such as colorization and lowered physical characteristics. The uses of polyphenylene ether resins are limited to a great extent by the low thermal stability.

Heretofore, there have been reported various methods for stabilizing polyphenylene ether resins. This drawback of polyphenylene ether is generally considered due to the terminal hydroxy group in the terminal group of the polymer and substituents to the benzene rings, and therefore, there has been proposed a method of stabilizing polyphenylene ether resins comprising protecting the terminal groups by acylation, but this stabilizing method is not only complicated, but also the stabilizing effect is not satisfactory. There have been proposals to add thermal stabilizing agents, but a satisfactory one has not yet found.

SUMMARY OF THE INVENTION

According to the present invention, there is provided a stabilized resin composition which comprises at least one member selected from the class of homopolymers and copolymers having a recurring unit of the formula:

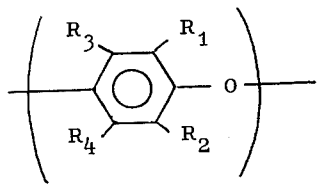

where $R_1$ is a member selected from the class of hydrogen, alkyl, haloalkyl having at least 2 carbon atoms between the halogen and the phenyl nucleus, alkoxy, and haloalkoxy having at least 2 carbon atoms between the halogen and the phenyl nucleus, $R_2$, $R_3$ and $R_4$ are similar or dissimilar and are selected from the class of the substituents are defined in $R_1$ above and halogen, $R_1$, $R_2$, $R_3$ and $R_4$ are not simultaneously hydrogen and are not simultaneously a substituent having an alpha carbon atom which is a tertiary carbon atom, and mixtures of the homopolymer and/or the copolymer with another high polymer, and, as a stabilizing agent, a substituted dicarboxylic acid dihydrazide of the formula:

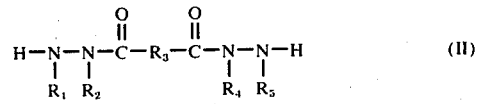

where $R_1$ and $R_5$ are similar or dissimilar and are selected from the class of alkyl, acyl, alkoxy, and aryl, $R_2$ and $R_4$ are similar or dissimilar and are selected from the class of hydrogen, alkyl and aryl, and $R_3$ is selected from a class of alkylene and arylene.

An object of the present invention is to provide a thermally stable polyphenylene ether resin composition.

Another object of the present invention is to provide a polyphenylene ether resin composition which is stable under thermal oxidation conditions.

A further object of the present invention is to provide polyphenylene ether resin compositions of high thermal stability by adding only a small amount of a substituted dicarboxylic acid dihydrazide.

DESCRIPTION OF THE PREFERRED EMBODIMENTS

The high polymer components of the stabilized resin composition may be at least one of homopolymers and copolymers having the recurring unit of the formula (I) above, and mixtures thereof with other high polymers.

The homopolymers and copolymers may be obtained by oxidative polycondensation of a phenol having the formula

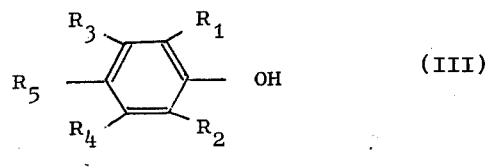

where $R_5$ is selected from the class of hydrogen, chloro, bromo and iodo, $R_1$, $R_2$, $R_3$ and $R_4$ are as defined above with respect to Formula (I) above.

The degree of polymerization is preferably not lower than 50.

Typical examples of the above mentioned phenols (III) are 2,6-dimethylphenol, 2-methyl-6-ethylphenol, 2,6-diethylphenol, 2,4,6-trimethylphenol, 2,6-dimethoxyphenol, 2-methyl-6-methoxyphenol, 2,6-dimethyl-4-ethylphenol, 2-methyl-6-n-propylphenol, 2-methyl-6-i-propylphenol, 2-methyl-6-phenylphenol, 2,6-diphenylphenol, 2,6-dimethyl-4-chlorophenol, and 2,6-dimethyl-4-bromophenol.

Typical examples of said other high polymers which may be mixed with the homopolymer and/or the copolymer having the recurring unit of Formula (I) are polystyrene, polychlorostyrene, polymethylstyrene, rubber modified polystyrene, acrylonitrile-butadiene-styrene copolymer, styrene-butadiene rubber, acrylonitrile-butadiene rubber, polystyrene-polycarbonate blends, and blends of polystyrene and styrene-butadiene rubber.

Examples of the mixture of the homopolymer and/or the copolymer with said other high polymer are: polyphenylene ether-polystyrene, polyphenylene ether-polychlorostyrene, polyphenylene ether-polymethylstyrene, polyphenylene ether-rubber modified polystyrene, polyphenylene ether-acrylonitrile-butadiene-styrene copolymer, polyphenylene ether-styrene-butadiene rubber, polyphenylene ether-acrylonitrile-butadiene rubber, 2,6-dimethylphenol-2,3,6-trimethylphenol copolymer - rubber modified polystyrene, 2,6-dimethylphenol polymer-2,3,6-trimethylphenol/2,6-dimethylphenol copolymer-polystyrene, styrene grafted polyphenylene ether-rubber modified polystyrene, polyphenylene ether-polystyrene-polycarbonate, and polyphenylene ether-polystyrene-styrene-butadiene rubber. (In the above enumeration, "polyphenylene ether" denotes homopolymer, copolymer or a combination of homopolymer and copolymer having the recurring unit of formula (I).) These polymers and copolymers may be modified by using a monomer, for example, vinyl aromatic compounds.

In Formula (II) above, substituted dicarboxylic acid $R_1$ and $R_5$ may be similar or dissimilar and are selected from the class of alkyl having 1 –4 4 carbon atoms, aliphatic acyl having 2 – 5 carbon atoms, aromatic acyl having 7 – 12 carbon atoms such as benzoyl and substituted benzoyl, alkoxy having 1 – 4 carbon atoms, aryl having 6 – 12 carbon atoms such as phenyl and substituted phenyl, $R_2$ and $R_4$ may be similar or dissimilar and are selected from the class of hydrogen, alkyl having 1 – 4 carbon atoms, and aryl having 6 – 12 carbon atoms such as phenyl and substituted phenyl, and $R_3$ may be alkylene having 1 – 20 carbon atoms, arylene having 6 – 12 carbon atoms such as phenylene and substituted phenylene.

Representative substituted dicarboxylic acid dihydrazides according to the present invention are:

malonic acid bis-acetyl hydrazide,
malonic acid bis-phenyl hydrazide,
malonic acid bis-benzoyl hydrazide,
malonic acid acetyl phenyl dihydrazide,
malonic acid bis-acetylphenyl hydrazide,
malonic acid bis-acetylmethyl hydrazide,
malonic acid bis-methyl hydrazide,
malonic acid bis-methoxy hydrazide,
succinic acid bis-acetyl hydrazide
succinic acid bis-phenyl hydrazide,
succinic acid bis-benzoyl hydrazide,
succinic acid acetyl phenyl dihydrazide,
succinic acid bis-acetylphenyl hydrazide,
succinic acid bis-acetylmethyl hydrazide,
succinic acid bis-methyl hydrazide,
succinic acid bis-methoxy hydrazide,
glutaric acid bis-acetyl hydrazide,
glutaric acid bis-phenyl hydrazide,
glutaric acid bis-benzoyl hydrazide,
glutaric acid acetyl phenyl dihydrazide,
glutaric acid bis-acetylphenyl hydrazide,
glutaric acid bis-acetylmethyl hydrazide,
glutaric acid bis-methyl hydrazide,
glutaric acid bis-methoxy hydrazide,
adipic acid bis-acetyl hydrazide,
adipic acid bis-phenyl hydrazide,
adipic acid bis-benzoyl hydrazide,
adipic acid bis-acetylphenyl hydrazide,
adipic acid acetyl phenyl dihydrazide,
adipic acid bis-toluyl hydrazide,
adipic acid bis-acetylmethyl hydrazide,
adipic acid bis-methyl hydrazide,
adipic acid bis-methoxy hydrazide,
suberic acid bis-acetyl hydrazide,
suberic acid bis-benzoyl hydrazide,
suberic acid bis-phenyl hydrazide,
suberic acid acetyl phenyl dihydrazide,
suberic acid bis-acetylphenyl hydrazide,
suberic acid bis-acetylmethyl hydrazide,
suberic acid bis-methyl hydrazide,
suberic acid bis-methoxy hydrazide,
azelaic acid bis-acetyl hydrazide,
azelaic acid bis-phenyl hydrazide,
azelaic acid bis-benzoyl hydrazide,
azelaic acid acetyl phenyl dihydrazide,
azelaic acid bis-acetylphenyl hydrazide,
azelaic acid bis-acetylmethyl hydrazide,
azelaic acid bis-methyl hydrazide,
azelaic acid bis-methoxy hydrazide,
sebacic acid bis-acetyl hydrazide,
sebacic acid bis-phenyl hydrazide,
sebacic acid bis-benzoyl hydrazide,
sebacic acid bis-acetylphenyl hydrazide,
sebacic acid acetyl phenyl dihydrazide,
sebacic acid bis-toluyl hydrazide,
sebacic acid bis-acetylmethyl hydrazide,
sebacic acid bis-methyl hydrazide,
sebacic acid bis-methoxy hydrazide,
decamethylene dicarboxylic acid bis-acetyl hydrazide,
decamethylene dicarboxylic acid bis-phenyl hydrazide,
terephthalic acid bis-acetyl hydrazide,
terephthalic acid bis-phenyl hydrazide,
terephthalic acid bis-benzoyl hydrazide,
terephthalic acid acetyl phenyl dihydrazide,
terephthalic acid bis-acetylphenyl hydrazide,
terephthalic acid bis-toluyl hydrazide,
terephthalic acid bis-acetylmethyl hydrazide,
terephthalic acid bis-methyl hydrazide,
terephthalic acid bis-methoxy hydrazide,
phthalic acid bis-acetyl hydrazide,
phthalic acid bisphenyl hydrazide,
phthalic acid bis-benzoyl hydrazide,
phthalic acid acetyl phenyl dihydrazide,
phthalic acid bis-acetylphenyl hydrazide,
phthalic acid bis-toluyl hydrazide,
phthalic acid bis-acetylmethyl hydrazide,
phthalic acid bis-methyl hydrazide,
phthalic acid bis-methoxy hydrazide,
isophthalic acid bis-acetyl hydrazide,
isophthalic acid bis-phenyl hydrazide,
isophthalic acid bis-benzoyl hydrazide,
isophthalic acid acetyl phenyl dihydrazide,
isophthalic acid bis-acetylphenyl hydrazide,
isophthalic acid bis-toluyl hydrazide,
isophthalic acid bis-acetylmethyl hydrazide,
isophthalic acid bis-methyl hydrazide, and
isophthalic acid bis-methoxy hydrazide.

According to the present invention, as a stabilizer, there are not used hydrazines, substituted hydrazines or unsubstituted dihydrazides of dicarboxylic acids. For example, when hydrated hydrazine or anhydrous hydrazine is used, it is evaporated or decomposed during the shaping process since the boiling temperature is low. Further, a substituted hydrazine such as 1,1-acetyl-2-phenyl hydrazine having boiling point of 170°C. is also unstable during the shaping process and is not suitable for a stabilizer for polyphenylene ether resins. Dicarboxylic acid dihydrazide can improve thermal stability of shaped polyphenylene ether resins as well as stability during the shaping process, but the shaped product is colorized and the appearance is markedly deteriorated. The cause of colorization is not yet known, but it is considered that terminal hydrogens of dicarboxylic acid dihydrazide are caused to react with oxygen to form nitroso groups, which cause colorization, since the shaping temperature of polyphenylene ether resins is higher than 240°C.

The amount of the substituted dicarboxylic acid hydrazide to be added to polyphenylene ether resin is usually 0.05 – 10% by weight based on the total amount of the high polymer components and preferably it is 0.1 – 5% by weight.

The substituted dicarboxylic acid hydrazide may be added to the resin powder as it is, or one or both of the substituted dicarboxylic acid hydrazide and the resin powder may be dissolved in a solvent and they are mixed and then, the solvent is removed. In general, the mixing method is not critical.

To the stabilized polyphenylene ether resin composition may be added other additives such as ultraviolet ray absorber, metal soap, pigment, dye, plasticizer, flame retardant and the like.

According to the present invention, the polyphenylene ether resin composition is highly resistant to heat and oxidation. Different from unsubstituted dicarboxylic acid dihydrazides, the substituted dicarboxylic acid dihydrazides according to the present invention neither colorize the resulting shaped articles nor cause scorch and therefore, the appearance of the shaped articles is not deteriorated. In addition, the substituted dicarboxylic acid dihydrazide has good compatibility with the resin and does not lower the physical properties of the polyphenylene ether resins. Accordingly, the substituted dicarboxylic acid hydrazides are excellent thermal stabilizers for polyphenylene ether resins.

The following examples are given by way of illustration and not limitation of this invention. In the examples, parts and percent are by weight unless otherwise specified.

EXAMPLES 1 – 11

Additives, 2.0 parts of triphenylphosphate and 3.0 parts of titanium oxide, were added to 50 parts of poly (2,6-dimethyl-1,4-phenylene ether) having intrinsic viscosity of 0.56 dl./g. (in chloroform, at 25°C), 43.5 parts of polystyrene (trade name, "Dialex HT-190," commercially available from Mitsubishi Monsanto Chemical Company), 2.5 parts of polycarbonate (trade name, "Jupilon E-2000," commercially available from Mitsubishi Gas Chemical Co., Inc.) and 40 parts of polystyrene-polybutadiene rubber (containing polybutadiene / polystyrene = 40/60) and sufficiently mixed by Henschel Mixer.

To the resulting mixture was added 0.5% by weight of a thermal stabilizer listed in Table 1 and mixed, and then dried for 1 day and night at 80°C, followed by extruding by a ZSK-type biaxial Extruder (Werner & Pfleiderer Corp.) at 240°– 290°C to produce the pellets. The pellets were subjected to injection molding at 260°– 280°C at 1400 kg./cm$^2$ to produce test pieces. The resulting test pieces were hung in an oven of the air circulating type at 120°C for a certain period of time to effect a thermal aging and then taken out of the oven to measure the physical properties.

Appearance of molds and physical property retaining rate after 200 hours of the thermal aging test are shown in Table 1 below. The physical property retaining rate is expressed by the physical property value after the test divided by the corresponding physical property value before the test (after molding) multipled by 100.

Table 1

| | Stabilizer | Appearance of mold | | Physical property retaining rate after 200 hours of thermal aging (%) | | | |
|---|---|---|---|---|---|---|---|
| | | Scorch | Colorization | Whiteness | Izod Impact Strength | Tensile Impact Strength (S-type) | Elongation |
| Comparative Example 1 | None | | Colored | 91.8 | 43.5 | 24.2 | 11.5 |
| Comparative Example 2 | Adipic acid dihydrazide | Occur | Markedly colored, brown | 84.0 | 65.1 | 61.3 | 70.7 |
| Comparative Example 3 | Terephthalic acid dihydrazide | " | " | 86.0 | 66.5 | 65.0 | 72.0 |
| Example 1 | Succinic acid bis-acetyl hydrazide | None | None | 95.0 | 60.0 | 50.0 | 70.0 |
| Example 2 | Succinic acid bis-benzoyl hydrazide | " | " | 93.0 | 60.0 | — | 65.0 |
| Example 3 | Adipic acid bis-acetyl hydrazide | " | " | 95.5 | 67.0 | 62.7 | 78.2 |
| Example 4 | Adipic acid bis-phenyl hydrazide | " | " | 95.0 | 65.1 | 62.0 | 70.0 |
| Example 5 | Adipic acid bis-benzoyl hydrazide | " | " | 93.0 | 55.5 | 40.0 | 50.0 |
| Example 6 | Adipic acid acetyl phenyl dihydrazide | " | " | 93.0 | 64.5 | 55.0 | 62.0 |
| Example 7 | Sebacic acid bis-acetyl hydrazide | " | " | 94.0 | 70.0 | 65.8 | 72.0 |
| Example 8 | Sebacic acid phenyl benzoyl dihydrazide | " | " | 93.0 | 65.0 | 65.0 | 64.0 |
| Example 9 | Terephthalic acid bis-acetyl hydrazide | " | " | 94.5 | 68.0 | 76.6 | 70.9 |
| Example 10 | Terephthalic acid bis-benzoyl hydrazide | " | " | 94.5 | 65.8 | 70.0 | 70.0 |
| Example 11 | Isophthalic acid | " | " | 94.5 | 64.0 | 70.5 | 68.0 |

Table 1-continued

| Stabilizer | Appearance of mold | | Physical property retaining rate after 200 hours of thermal aging (%) | | | |
|---|---|---|---|---|---|---|
| | Scorch | Colorization | Whiteness | Izod Impact Strength | Tensile Impact Strength (S-type) | Elongation |
| bis-acetyl hydrazide | | | | | | |

I claim:

1. In a polyphenylene ether resin composition comprising at least one member selected from the class of homopolymers and copolymers having a recurring unit of the formula

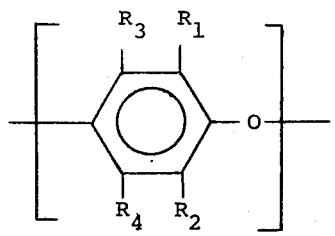

(I)

wherein $R_1$ is a member selected from the class of hydrogen, alkyl, halo-alkyl having at least two carbon atoms between the halogen and the phenyl nucleus, alkoxy and haloalkoxy having at least two carbon atoms between the halogen and the phenyl nucleus; $R_2$, $R_3$, and $R_4$ are the same or different and are selected from the class of the substituents defined for $R_1$ and halogen, $R_1$, $R_2$, $R_3$, and $R_4$ not being simultaneously hydrogen and not being simultaneously a substituent having a tertiary alpha carbon atom, and mixtures containing such polymers, the improvement which comprises incorporating as a stabilizer a substituted dicarboxylic acid dihydrazide having the formula

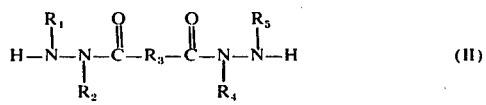

(II)

wherein $R_1$ and $R_5$ are the same or different and are selected from the class of alkyl, acyl, alkoxy, and aryl; $R_2$ and $R_4$ are the same or different and are selected from the class of hydrogen, alkyl, and aryl; and $R_3$ is selected from the class of alkylene and arylene.

2. A stabilized polyphenylene ether resin composition according to claim 1 in which in Formula (II) $R_1$ and $R_5$ are selected from the class of alkyl having 1–4 carbon atoms, aliphatic acyl having 2–5 carbon atoms, aromatic acyl having 7–12 carbon atoms, alkoxy having 1–4 carbon atoms, and aryl having 6 12 carbon atoms; $R_2$ and $R_4$ are selected from the class of hydrogen, alkyl having 1–4 carbon atoms, and aryl having 6–12 carbon atoms; and $R_3$ is selected from the class of alkylene having 1–20 carbon atoms and arylene having 6–12 carbon atoms.

3. A stabilized polyphenylene ether resin composition according to claim 1 in which in Formula (II) $R_1$ and $R_5$ are selected from the class of alkyl having 1–4 carbon atoms, aliphatic acyl having 2–5 carbon atoms, benzoyl, substituted benzoyl, alkoxy having 1–4 carbon atoms, phenyl and substituted phenyl; $R_2$ and $R_4$ are selected from the class of hydrogen, alkyl having 1–4 carbon atoms, phenyl and substituted phenyl; and $R_3$ is selected from the class of alkylene having 1–20 carbon atoms, phenylene, and substituted phenylene.

4. A stabilized polyphenylene ether resin composition according to claim 1 in which the mixture contains at least one member selected from the class of polystyrene, polychlorostyrene, polymethylstyrene, rubber modified polystyrene, acrylonitrile-butadiene-styrene copolymer, styrene-butadiene rubber, acrylonitrile-butadiene rubber, blends containing polystyrene and polycarbonate, and blends containing polystyrene and styrene-butadiene rubber.

5. A stabilized polyphenylene ether resin composition according to claim 1 in which the amount of the substituted dicarboxylic acid dihydrazide is from 0.05 to 10% based on the total amount of the high polymer components.

6. In a polyphenylene ether resin composition which comprises at least one member selected from the class of homopolymers and copolymers having a recurring unit of the formula:

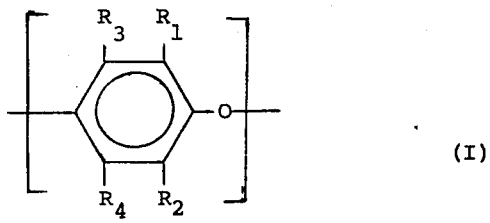

(I)

where $R_1$ is a member selected from the class of hydrogen, alkyl, haloalkyl having at least two carbon atoms between the halogen and the phenyl nucleus, alkoxy and haloalkoxy having at least two carbon atoms between the halogen and the phenyl nucleus; $R_2$, $R_3$, and $R_4$ are the same or different and are selected from the class of the substituents as defined for $R_1$ and halogen; $R_1$, $R_2$, $R_3$, and $R_4$ not being simultaneously hydrogen and not simultaneously being a substituent having a tertiary alpha carbon atom, and mixtures containing such polymers, the improvement which comprises incorporating as a stabilizer a substituted dicarboxylic acid dihydrazide of the formula:

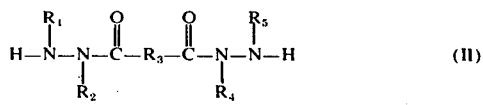

(II)

where $R_1$ and $R_5$ are the same or different and are selected from the class of alkyl having 1–4 carbon atoms, aliphatic acyl having 2–5 carbon atoms, benzoyl, substituted benzoyl, alkoxy having 1–4 carbon atoms, phenyl, and substituted phenyl; $R_2$ and $R_4$ are the same or different and are selected from the class of hydrogen, alkyl having 1–4 carbon atoms, phenyl, and substituted phenyl; and $R_3$ is selected from the class of alkylene having 1–20 carbon atoms, phenylene, and substituted phenylene, and the amount of the substituted dicarboxylic acid dihydrazide is from 0.05 to 10% based on the total amount of the polymers.

7. A stabilized polyphenylene ether resin composition according to claim 6 in which the mixture contains at least one member selected from the class of polystyrene, polychlorostyrene, polymethylstyrene, rubber modified polystyrene, acrylonitrile-butadiene-styrene copolymer, styrene-butadiene rubber, acrylonitrile-butadiene rubber, blends containing polystyrene and polycarbonate, and blends containing polystyrene and styrene-butadiene rubber.

* * * * *

UNITED STATES PATENT OFFICE
CERTIFICATE OF CORRECTION

PATENT NO. : 3,954,904
DATED : May 4, 1976
INVENTOR(S) : EIICHI YONEMITSU ET AL

It is certified that error appears in the above-identified patent and that said Letters Patent are hereby corrected as shown below:

Column 3, line 19, "1 -4 4" should read --1-4--.

Column 7, Claim 2, line 57, insert a hyphen between "6" and "12".

Signed and Sealed this

Twentieth Day of July 1976

[SEAL]

Attest:

RUTH C. MASON
Attesting Officer

C. MARSHALL DANN
Commissioner of Patents and Trademarks